(12) United States Patent
Lau

(10) Patent No.: US 7,667,911 B2
(45) Date of Patent: Feb. 23, 2010

(54) SELF SERVO WRITING DISK CONTROLLER AND METHODS FOR USE THEREWITH

(75) Inventor: King Wai Thomas Lau, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 673 days.

(21) Appl. No.: 11/521,040

(22) Filed: Sep. 14, 2006

(65) Prior Publication Data

US 2007/0285822 A1 Dec. 13, 2007

Related U.S. Application Data

(60) Provisional application No. 60/813,194, filed on Jun. 12, 2006.

(51) Int. Cl.
*G11B 5/09* (2006.01)
(52) U.S. Cl. .............................. 360/51; 360/48; 360/75; 360/77.02
(58) Field of Classification Search ........................ None
See application file for complete search history.

(56) References Cited

U.S. PATENT DOCUMENTS

| | | | | |
|---|---|---|---|---|
| 5,668,679 A * | 9/1997 | Swearingen et al. | ........... | 360/75 |
| 5,793,556 A * | 8/1998 | Freitas | ..................... | 360/77.08 |
| 5,907,448 A * | 5/1999 | Watanabe et al. | ......... | 360/77.04 |
| 6,704,156 B1 * | 3/2004 | Baker et al. | .................... | 360/75 |
| 6,738,205 B1 * | 5/2004 | Moran et al. | ................... | 360/17 |
| 6,798,610 B1 * | 9/2004 | Deng et al. | ............... | 360/78.05 |
| 6,985,316 B1 * | 1/2006 | Liikanen et al. | ................ | 360/29 |
| 7,088,533 B1 * | 8/2006 | Shepherd et al. | ............... | 360/51 |
| 7,167,333 B1 * | 1/2007 | Liikanen et al. | ................ | 360/75 |
| 7,209,312 B1 * | 4/2007 | Sutardja | ................... | 360/77.07 |
| 7,375,918 B1 * | 5/2008 | Shepherd et al. | .......... | 360/78.14 |
| 7,382,564 B1 * | 6/2008 | Everett et al. | .................. | 360/75 |
| 7,411,758 B1 * | 8/2008 | Cheung et al. | ................. | 360/75 |
| 7,433,143 B1 * | 10/2008 | Ying et al. | ..................... | 360/51 |
| 7,453,661 B1 * | 11/2008 | Jang et al. | ...................... | 360/75 |
| 7,471,481 B2 * | 12/2008 | Lau et al. | ....................... | 360/75 |
| 7,499,236 B1 * | 3/2009 | Lee et al. | ....................... | 360/75 |
| 7,623,313 B1 * | 11/2009 | Liikanen et al. | ................ | 360/75 |

* cited by examiner

*Primary Examiner*—Dismery E Mercedes
(74) *Attorney, Agent, or Firm*—Garlick Harrison & Markison; Bruce E. Stuckman

(57) ABSTRACT

A self servo writing disk controller detects a plurality of spiral sync marks and a plurality of spiral bursts corresponding to one of a plurality of servo spirals from a read signal from the read/write head. A timing reference signal is generated based on timing of at least one of the plurality of the spiral sync marks. A position error signal is generated based on timing of at least one of the plurality of spiral sync marks and a magnitude of at least one of a plurality of spiral bursts. The timing reference signal and the position error signal are used by the disk drive for timing and positioning in self writing initial servo wedges to the disk.

23 Claims, 14 Drawing Sheets

SELF SERVO WRITING DISK CONTROLLER AND METHODS FOR USE THEREWITH

CROSS REFERENCE TO RELATED PATENTS

This invention is claiming priority under 35 USC §119(e) to a provisionally filed patent application having the same title as the present patent application, a filing date of Jun. 12, 2006, and an application number of 60/813,194.

BACKGROUND OF THE INVENTION

1. Technical Field of the Invention

The present invention relates to the self servo writing disk drives and related methods.

2. Description of Related Art

As is known, many varieties of disk drives, such as magnetic disk drives are used to provide data storage for a host device, either directly, or through a network such as a storage area network (SAN) or network attached storage (NAS). Typical host devices include stand alone computer systems such as a desktop or laptop computer, enterprise storage devices such as servers, storage arrays such as a redundant array of independent disks (RAID) arrays, storage routers, storage switches and storage directors, and other consumer devices such as video game systems and digital video recorders. These devices provide high storage capacity in a cost effective manner.

As a magnetic hard drive is manufactured, portions of the disk are prerecorded at the factory. A plurality of servo spirals are written to the disk in spiral patterns that begin from the innermost to the outermost writeable section of the disk. In addition, a plurality of servo wedges are written to the disk contained in radial segments about the disk. For each track on the disk, each servo wedge contains a servo field that is recorded with a preamble, a synchronization mark and servo data. Examples of servo data include a servo address mark, wedge number, track number, and burst data used by a disk controller to control the rotation of the disk and the position of the read/write heads of the disk drive. Given the need for highly accurate positioning, these servo spirals and servo wedges are traditionally recorded on the disk using a servo writer. Given a desire to minimize the use of the servo writer, certain self servo writing disk drives write the servo spirals and only a certain number of seed servo wedges, with the remaining servo wedges being written to the disk by the disk drive itself.

A sizable market has developed for these devices and the price per unit of storage has steadily dropped. Modern host devices are provided with greater storage capacity at reduced cost, compared with devices that where manufactured a few years earlier. The need exists for provide hard drives that can be manufactured efficiently on a mass scale with high accuracy.

SUMMARY OF THE INVENTION

The present invention sets forth a self servo writing disk controller and methods for use therewith substantially as shown in and/or described in connection with at least one of the figures, as set forth more completely in the claims that follow.

DETAILED DESCRIPTION OF THE INVENTION INCLUDING THE PRESENTLY PREFERRED EMBODIMENTS

Figure 1:
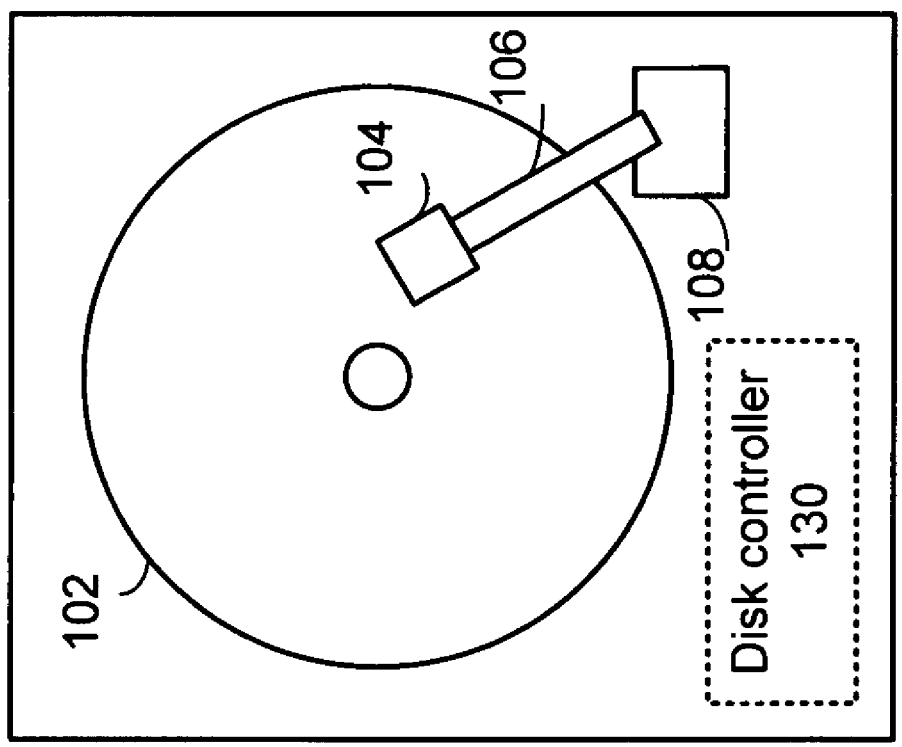
FIG. 1 presents a pictorial representation of a disk drive unit 100 in accordance with an embodiment of the present invention.

FIG. 1 presents a pictorial representation of a disk drive unit 100 in accordance with an embodiment of the present invention. In particular, disk drive unit 100 includes a disk 102 that is rotated by a servo motor (not specifically shown) at a velocity such as 3600 revolutions per minute (RPM), 4200 RPM, 4800 RPM, 5,400 RPM, 7,200 RPM, 10,000 RPM, 15,000 RPM, however, other velocities including greater or lesser velocities may likewise be used, depending on the particular application and implementation in a host device. In an embodiment of the present invention, disk 102 can be a magnetic disk that stores information as magnetic field changes on some type of magnetic medium. The medium can be a rigid or nonrigid, removable or nonremovable, that consists of or is coated with magnetic material.

Disk drive unit 100 further includes one or more read/write heads 104 that are coupled to arm 106 that is moved by actuator 108 over the surface of the disk 102 either by translation, rotation or both. In an embodiment of the present invention, the read/write heads 104 include a write element, such as a monopole write element that writes data on the disk with perpendicular magnetic recording (PMR), longitudinal magnetic recording (LMR) or other recording orientation. This allows for greater recording density and greater storage capacity for the drive. However, other recording configurations can likewise be used within the broad scope of the present invention.

A disk controller 130 is included for controlling the read and write operations to and from the drive, for controlling the speed of the servo motor and the motion of actuator 108, and for providing an interface to and from the host device.

When disk drive 100 is manufactured, a servo writer is used to write a plurality of servo spirals on the disk 102. When the disk 102 is then installed in the drive, disk controller 130 runs a self servo writer routine that determines position and timing information by reading the servo spirals and that writes the servo wedges on the disk. In particular, disk controller 130 detects a plurality of spiral sync marks and a plurality of spiral bursts corresponding to one of a plurality of servo spirals from a read signal from the read/write head. A timing reference signal is generated based on timing of at least one of the plurality of the spiral sync marks. A position error signal is generated based on timing of at least one of the plurality of spiral sync marks and a magnitude of at least one of a plurality of spiral bursts. The timing reference signal and the position error signal are used by the disk drive 100 for timing and positioning in self writing initial servo wedges to the disk 102. The present invention includes several benefits that will be apparent to one skilled in the art based on the disclosure that follows. In particular, the present invention detects spiral sync marks and burst magnitude during start up that enables simultaneous and/or contemporaneous timing locking and position locking.

Further details including several embodiments of the present invention will be discussed in conjunction with the figures that follow.

Figure 2:
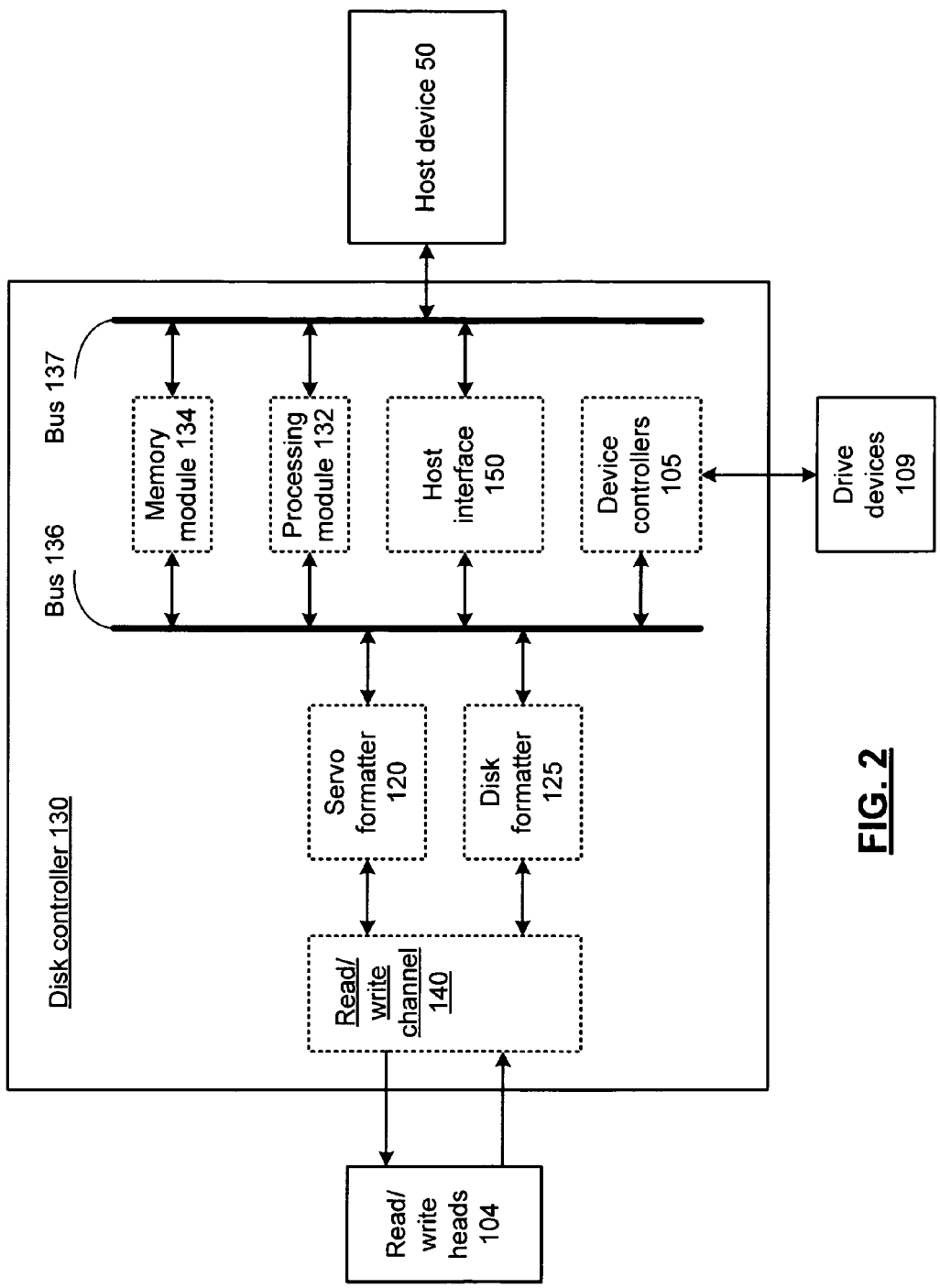
FIG. 2 presents a block diagram representation of a disk controller 130 in accordance with an embodiment of the present invention.

FIG. 2 presents a block diagram representation of a disk controller 130 in accordance with an embodiment of the present invention. In particular, disk controller 130 includes a read/write channel 140 for reading and writing data to and from disk 102 through read/write heads 104.

Disk formatter 125 is included for controlling the formatting of data and provides clock signals and other timing signals that control the flow of the data written to, and data read from disk 102. In particular, read/write channel 140 is operably coupled to the read/write head to read the servo data 118 from the disk. Servo formatter 120 is operably coupled to the read/write channel 140 to generate timing and position signals 116 based on the servo data 118 that is read, so that device controllers 105 can control the operation of the plurality of drive devices based on the timing and position signals 116.

In an embodiment of the present invention, the read/write channel includes a repetition decoder, majority logic detection, matched filter, correlator, integrator and/or maximum likelihood detector for decoding gray-coded track identification data 216 and the burst data 218. This servo data is used to extract the track number, by gray decoding the track identification data. In addition, subtrack position is determined based on the relative magnitudes of A, B, C, and D data bursts 218. Further details regarding the subtrack control and positioning are presented in U.S. Pat. No. 6,108,151, Sampled Amplitude Read Channel for Reading User Data and Embedded Servo Data from a Magnetic Medium, filed on Apr. 25, 1997.

In addition, the servo formatter 120 generates timing information based on the detected servo address mark 220 for use by device controllers 105 for controlling the actuator 108 and spindle motor, and optionally for generating other timing information used by disk formatter 125 and read/write channel 140 in timing of disk write operations. Further details regarding the use of servo address mark 220 in such timing operations are presented in pending U.S. patent applications Disk controller and methods for use therewith, having Ser. No. 11/311,725; Media event timer and methods for use therewith, having Ser. No. 11/311,727; and Read/write timing generator and methods for use therewith, having Ser. No. 11/311,726.

Host interface 150 receives read and write commands from host device 50 and transmits data read from disk 102 along with other control information in accordance with a host interface protocol. In an embodiment of the present invention the host interface protocol can include, SCSI, SATA, enhanced integrated drive electronics (EIDE), or any number of other host interface protocols, either open or proprietary that can be used for this purpose.

Disk controller 130 further includes a processing module 132 and memory module 134. Processing module 132 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signal (analog and/or digital) based on operational instructions that are stored in memory module 134. When processing module 132 is implemented with two or more devices, each device can perform the same steps, processes or functions in order to provide fault tolerance or redundancy. Alternatively, the function, steps and processes performed by processing module 132 can be split between different devices to provide greater computational speed and/or efficiency.

Memory module 134 may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the processing module 132 implements one or more of its functions via a state machine, analog circuitry, digital circuitry, and/or logic circuitry, the memory module 134 storing the corresponding operational instructions may be embedded within, or external to, the circuitry comprising the state machine, analog circuitry, digital circuitry, and/or logic circuitry. Further note that, the memory module 134 stores, and the processing module 132 executes, operational instructions that can correspond to one or more of the steps or a process, method and/or function illustrated herein.

Disk controller 130 includes a plurality of modules, in particular, device controllers 105, processing module 132, memory module 134, read/write channel 140, disk formatter 125, servo formatter 120 and host interface 150 that are interconnected via buses 136 and 137. Each of these modules can be implemented in hardware, firmware, software or a combination thereof, in accordance with the broad scope of the present invention. While a particular bus architecture is shown in FIG. 2 with buses 136 and 137, alternative bus architectures that include either a single bus configuration or additional data buses, further connectivity, such as direct connectivity between the various modules, are likewise possible to implement the features and functions included in the various embodiments of the present invention.

In an embodiment of the present invention, one or more modules of disk controller 130 are implemented as part of a system on a chip integrated circuit. In an embodiment of the present invention, this system on a chip integrated circuit includes a digital portion that can include additional modules such as protocol converters, linear block code encoding and decoding modules, etc., and an analog portion that includes additional modules, such as a power supply, disk drive motor amplifier, disk speed monitor, read amplifiers, etc. In a further embodiment of the present invention, the various functions and features of disk controller 130 are implemented in a plurality of integrated circuit devices that communicate and combine to perform the functionality of disk controller 130. Additional details regarding the self servo writing functionality of disk controller 130 are presented in conjunction with FIG. 3 that follows.

Figure 3:
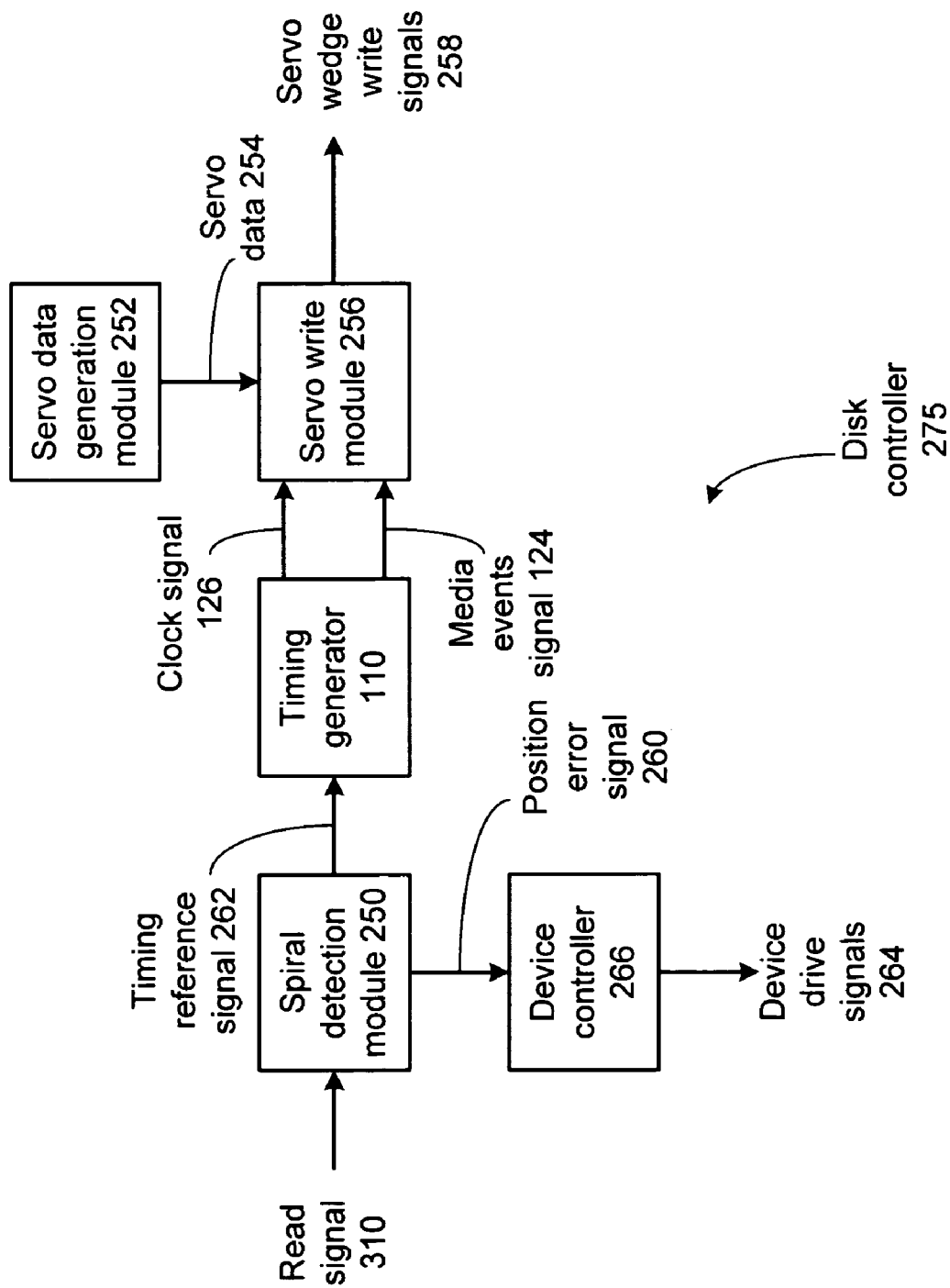
FIG. 3 presents a block diagram representation of a disk controller 275 in accordance with an embodiment of the present invention.

FIG. 3 presents a block diagram representation of a disk controller 275 in accordance with an embodiment of the present invention. In particular, disk controller 275 is a self servo writing disk controller for use in a disk drive, such as disk drive 100, having at least one read/write head for reading data from and writing data to a disk, such as disk 102.

Read/write channel 140 includes a spiral detection module 250 that analyzes a read signal 310 from the read/write head, detects a plurality of spiral sync marks and a plurality of spiral bursts corresponding to one of a plurality of servo spirals written on the disk, and that generates a timing reference signal 262 based on timing of at least one of the plurality of the spiral sync marks and a position error signal 260 based on timing of at least one of the plurality of spiral sync marks and a magnitude of at least one of the plurality of spiral bursts. Timing generator 110 generates a clock signal 126 and media events signal that includes at least one media event trigger that is based on the timing reference signal 262.

Device controller 266 controls at least one drive device of disk drive 100, (such as to control the position of the read/write head, the velocity of the disk 102, etc.) via device drive signals 264, based on the position error signal. Servo data generation module 252 generates servo data 254 corresponding to a plurality of servo wedges of the disk 252. Servo write module 256 generates servo wedge write signals 258 for writing the plurality of servo wedges on the disk based on the clock signal and the at least one media event trigger of media events signal 124.

In operation in accordance with an embodiment of the present invention, the disk controller 275 self writes the servo wedges on the disk, based only on the servo spirals. In this fashion, the time that disk 102 is on the servo writer in the factory can potentially be reduced, since only the servo spirals need to be written.

In an embodiment of the present invention, disk controller 275 is implemented using the architecture set forth in disk controller 130 discussed in conjunction with FIG. 2. In particular, the device controller 266 is implemented as one or more of the device controllers 105, and the spiral detection module 250, timing generator 110, servo write module 256 and the servo data generation module 252 are implemented as either portions of, or adjuncts to, the read/write channel 140, servo formatter 120 and disk formatter 125 of disk controller 130. Consequently, each of these elements can be implemented as modules of disk controller 130 in software, firmware or hardware, depending on the implementation of disk controller 130.

Further details regarding the possible operation and implementations of spiral detection module 250 are presented in association with FIGS. 4-10. Further details regarding the possible operation and implementations of timing generator 110 are presented in association with FIG. 1. Further details regarding the writing of the servo data 254 is presented in association with FIGS. 12-13.

Figure 4:
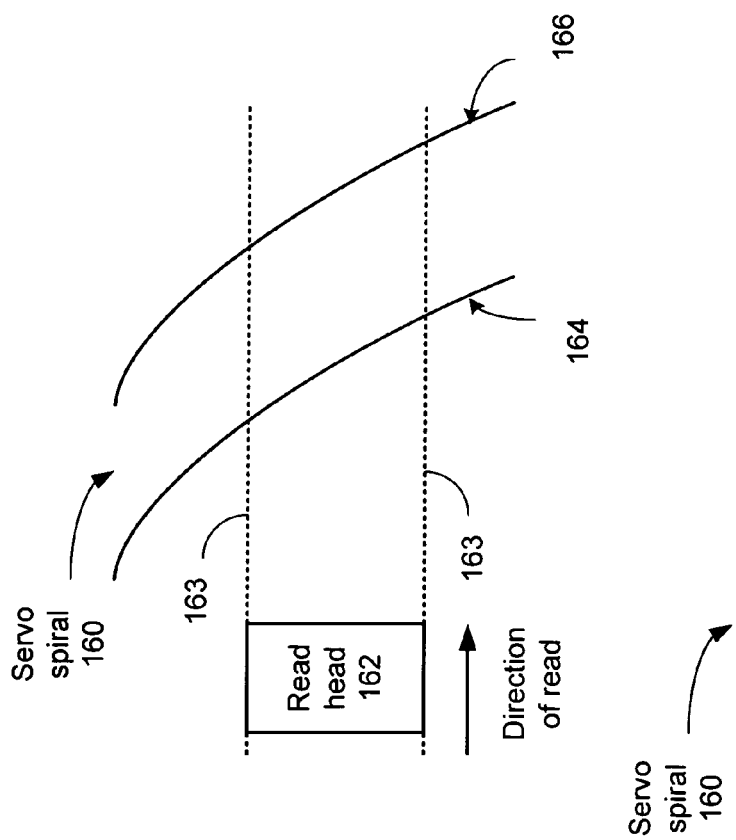
FIG. 4 presents a pictorial representation of the reading of a servo spiral 160 by a read head 162 in accordance with an embodiment of the present invention.

FIG. 4 presents a pictorial representation of the reading of a servo spiral 160 by a read head 162 in accordance with an embodiment of the present invention. In particular, the disk, such as disk 102, has been recorded with a plurality of servo spirals, each spiral traversing a spiral path from the innermost, to the outermost, data area of the disk. In an embodiment of the present invention, 400 servo spirals are recorded, corresponding to twice the intended number of servo wedges, however, a greater or lesser number of servo spirals, and/or servo wedges (with a potentially different relationship between the number of servo spirals and servo wedges) can otherwise be used.

The reading of a particular portion of a particular servo spiral 160 is illustrated. Read head 162 follows a path along the disk that is bounded by dashed lines 163. Read head 162 initially intersects servo spiral 160 at boundary 164 and subsequently passes through boundary 166 after leaving the area of servo spiral 160. Read head 162 generates a read signal that initially has a negligible magnitude prior to the intersection because the portions of the disk outside of the servo spirals are effectively blank. The intersection of the path of read head 162 and servo spiral 160 generates a read signal that grows in magnitude as the read head 162 intersects a greater portion of boundary 164 and that decreases in magnitude as the read head 162 intersects a smaller portion of boundary 166. The result is a read signal having an envelope that ramps upward and then ramps downward.

Figure 5:
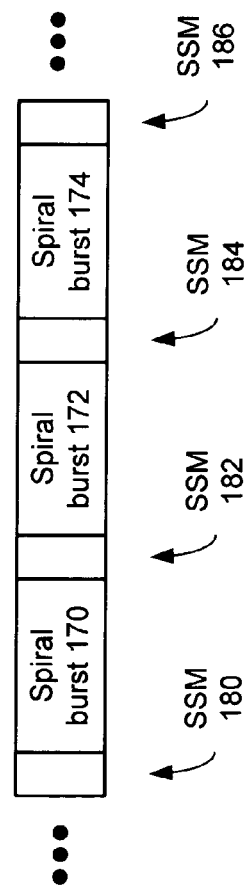
FIG. 5 presents a block diagram representation of the contents of servo spiral 160 in accordance with an embodiment of the present invention.

FIG. 5 presents a block diagram representation of the contents of servo spiral 160 in accordance with an embodiment of the present invention. In particular, the servo spiral, such as servo spiral 160, is written with a plurality of spiral sync marks (SSMs) 180, 182, 184, and 186 that are separated by a spiral bursts 170, 172, 174, .... While four spiral servo marks and three spiral busts are shown, a single servo spiral, such as servo spiral 160 includes a far greater number of spiral sync marks and spiral bursts continuously along its path. While the actual number of spiral sync marks is dependent upon such factors as the number of tracks of the disk and the dimensions of the read head 162, the spiral sync mark density is chosen such that when the read head 162 traverses the servo spiral 160, a minimum number of spiral sync marks, such as 1, 2, 3, 4, or more are necessarily traversed, regardless of the particular position of the head.

In an embodiment of the present invention, the spiral sync marks are special binary patterns encoded with partial response signaling that uses wide bi-phase encoding and pulses such as EPR4 pulses. In effect, each peak in a wide bi-phase cell represents a 1 or a 0. Consider the following example:

| SSM binary pattern: | 0 | | | | | 1 | | | | 0 | |
|---|---|---|---|---|---|---|---|---|---|---|---|
| SSM Pattern after wide biphase encoding: | 1 | 1 | 0 | 0 | 0 | 0 | 1 | 1 | 1 | 1 | 0 | 0 |
| SSM pattern after EPR4: | x | x | x | −2 | −1 | 0 | 1 | 2 | 1 | 0 | −1 | −2 |

The servo sync mark (SSM) is an alternating pattern of binary digits that is wide biphase encoded and that generates a signal with either positive or negative peaks (−2, 2, −2 . . . ) when read by read head 104.

Figure 6:
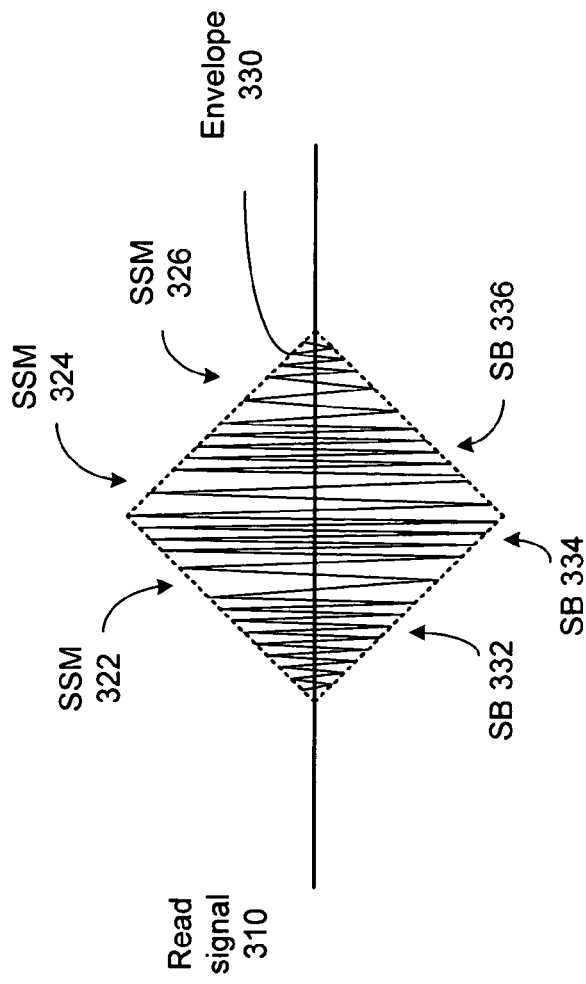
FIG. 6 presents a graphical representation of a read signal generated by reading a portion of a servo spiral in accordance with an embodiment of the present invention.

FIG. 6 presents a graphical representation of a read signal generated by reading a portion of a servo spiral in accordance with an embodiment of the present invention. In particular, read signal 310 presents a typical diamond pattern generated by a read head, such as read head 162 traversing a potion of a servo spiral such as servo spiral 160. As discussed in conjunction with FIGS. 4 and 5, spiral bursts 332, 334 and 336 generate sinusoidal responses at a first frequency and spiral sync marks 322, 324, and 326, generate sinusoidal responses at a second frequency, and read signal 310 has an envelope 330 that ramps upward and then ramps downward.

In an embodiment of the present invention, spiral detection module 250 compares the magnitude of the read signal 310 to a signal threshold, and triggers the detection of the plurality of spiral sync marks and a plurality of spiral bursts when the magnitude of the read signal compares favorably to the signal threshold. In this fashion, the spiral detection module waits until a signal of sufficiently high signal strength is detected to ignore spurious signals that may occur in the blank regions between the servo spirals and to only begin detection after the magnitude of the read signal 310 indicates that a "good" signal is present. In an embodiment, the magnitude of the read signals is envelope detected, peak detected, averaged and/or filtered, such as by lowpass filtering, prior to the comparison to avoid triggering on transient signals, impulsive noise, or other anomalous behavior that is not indicative of the reading of a servo spiral.

Spiral detection module 250 detects the plurality of spiral sync marks based on the detection of peaks in the read signal. In particular, the spiral detection module 250 upsamples the read signal 310 to form interpolated read samples and detects the plurality of spiral sync marks based on the detection of peaks in the interpolated read samples. The interpolation and peak detection used in this method of detecting spiral sync marks, provides an approach that is relatively insensitive to the variations in frequency that are likely present, and also lends itself to methods for determining the magnitude of the spirals bursts described below, however, other methods including the use of bandpass filters, matched filters, integrators, and correlators, etc. can likewise be employed to detect a spiral sync mark in the read signal 310.

In an embodiment of the present invention, spiral detection module generates a timing reference signal based on the timing of one of the plurality of spiral sync marks. While any of the spiral sync marks, such as the first spiral sync mark, SSM 322, or the last spiral sync mark, SSM 326 could be used for this purpose, the centermost one of the plurality of spiral sync marks, in this case SSM 324, makes a desirable reference point. In particular, the location of the SSM 324 near the center of envelope 330 means that the read signal corresponding to SSM 324 has a higher magnitude and, presumably can be detected with a greater reliability than other spiral sync marks.

The timing reference signal, potentially in conjunction with the timing reference signals generated by reading subsequent traversals of other servo spirals, can be used to control the frequency of internal read write operations, such as to control the locking of a disk locked clock that is used for this purpose, and/or to trigger or adjust the timing of other events such as read gate signals, write gate signals, etc. In particular, if the servo wedges to be written on the disk are spaced in a predetermined relationship to the servo spirals, the timing reference signal can be used in place of the servo address marks for timing, before the servo wedges are written. For instance, if the servo wedges to written on the disk are spaced in a predetermined relationship to the servo spirals such as one wedge to every two spirals, the timing reference signal from every other servo spiral can be used in place of a servo address mark that occurs once per servo wedge to generate an equivalent timing reference.

The spiral detection module 250 can also generate position error signal 260 in several ways. In an embodiment of the present invention, the spiral detection module 250 identifies a centermost one of the plurality of spiral sync marks and generates the position error signal 260 based on a magnitude of a first of the plurality of spiral bursts that precedes the centermost one of the plurality of spiral sync marks and a magnitude of a second of the plurality of spiral bursts that succeeds the centermost one of the plurality of spiral sync marks. Considering the example read signal 310 presented in FIG. 6, the centermost spiral sync mark 324 can be determined based on either the spiral sync mark having a highest magnitude, or a the spiral sync mark closest to the center of the envelope 330, determined, for instance, based on time period that the magnitude of the read signal compares favorably to the signal threshold discussed above. The relative magnitudes of servo burst 334 and servo burst 336 can be compared and/or otherwise used to determine position error signal 260. In an embodiment of the present invention, spiral detection module 250 integrates the magnitude of the first of the plurality of spiral bursts to generate a first integrated burst magnitude and integrates the magnitude of the second of the plurality of spiral bursts to generate a second integrated burst magnitude and that generates the position error signal based on the difference between the first integrated burst magnitude and the second integrated burst magnitude. In terms of the example read signal 310 of FIG. 6, the magnitude of the servo bursts 334 and 336 are each integrated over the corresponding burst duration to generate an integrated burst magnitude for each burst, and subtracted to generate a position error signal. In this case, the integrated magnitude servo burst 334 is greater than the integrated magnitude of servo burst 336 indicating a skew in the diamond pattern and a corresponding position error.

As discussed above, other methods for determining position error are likewise possible. The method described above can be modified to consider the integrated magnitude of 2 or more spiral bursts on either side of the centermost SSM. Further, the offset of the centermost SSM from the peak of the magnitude envelope, such as envelope 330, can be used to estimate position error. In a further embodiment, spiral detection module 250 integrates the magnitude of each of the plurality spiral bursts to form a burst magnitude integration, identifies a spiral burst centroid based on the burst magnitude integration, and that generates the position error signal based on a position of the spiral burst centroid, in relation to the beginning and ending of the diamond pattern as determined based on the period of time that the read signal magnitude compares favorably to the signal threshold.

Figure 7:
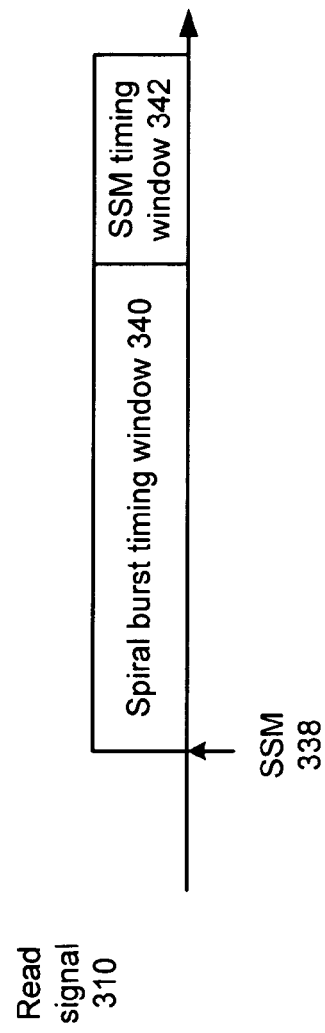
FIG. 7 presents a graphical diagram representation of a burst mark timing window 340 and spiral sync mark timing window 342 in accordance with an embodiment of the present invention.

FIG. 7 presents a graphical diagram representation of a burst mark timing window 340 and spiral sync mark timing window 342 in accordance with an embodiment of the present invention. After spiral detection module 250 detects the first spiral sync mark, it can simplify its detection of subsequent spiral sync marks in the same diamond pattern and the duration of intervening spiral bursts, based on a windowing technique. In particular, spiral detection module 250 detects the plurality of spiral sync marks by detecting a first of the plurality of spiral sync marks 338, generating a spiral sync mark timing window, such as SSM timing window 342, that corresponds to the estimated timing of a subsequent one of the plurality of spiral sync marks, and the detection of the subsequent one of the plurality of spiral sync marks within the spiral sync mark timing window. This estimated timing window can be broadened to encompass one or more additional cycles of the spiral sync mark to be detected to help compensate for variations in frequency prior to frequency lock. Similarly, spiral detection module 250 can detect the plurality of spiral bursts by detecting one of the plurality of spiral sync marks, generating a spiral burst timing window, such as spiral burst timing window 340, that corresponds to the estimated timing of a subsequent spiral burst of the plurality of spiral bursts, and the detection of the subsequent one of the plurality of spiral bursts within the spiral burst timing window. It should be noted that the beginning, ending, center or other consistently defined point in a spiral sync mark, such as spiral sync mark 338, can be used to generate the timing of spiral burst timing window 340 and spiral sync mark timing window 342.

Figure 8:
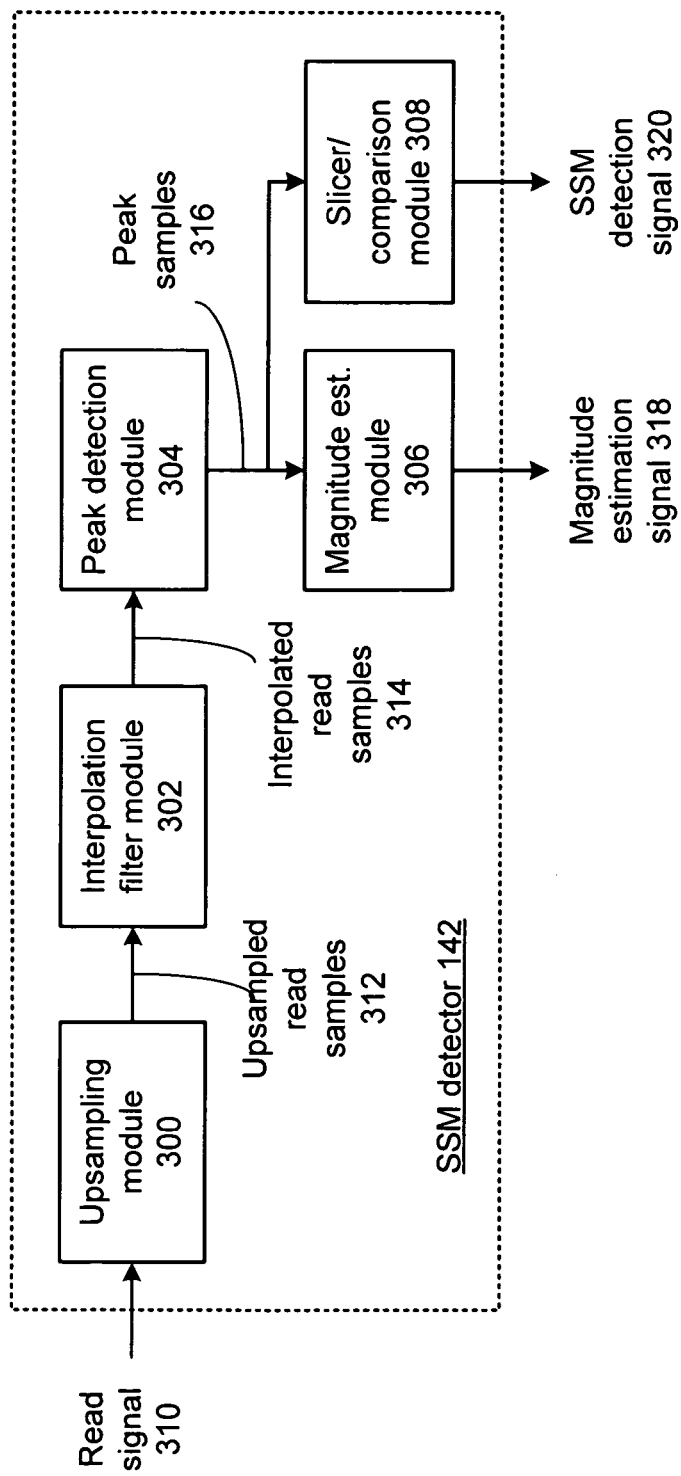
FIG. 8 presents a block diagram representation of a spiral sync mark detector 142 in accordance with an embodiment of the present invention.

FIG. 8 presents a block diagram representation of a spiral sync mark detector 142 in accordance with an embodiment of the present invention that can be used, in the implementation of spiral detection module 250, for generating timing reference signals such as SSM detection signal 320 and magnitude estimation signals such as magnitude estimation signal 318, that are used in determining timing and the position of the read head. Broadly speaking, the spiral sync mark detector 142 operates by interpolating the read signal 310, tracking the peaks in the signal, slicing the detected peaks into binary values, (such as assigning positive peaks as binary 1, and negative peaks as binary 0), and comparing the generated pattern to the spiral sync mark binary pattern that was used to generate SSM detection signal 320 when a spiral sync mark is detected. In particular, spiral sync mark detector 142 includes an upsampling module 300 that generates a plurality of upsampled read samples by upsampling a discrete-time read signal by an upsampling factor. Considering the read signal 310 as a discrete time signal f(k), the upsampled read samples 312 can be represented as g(n) where: g(n)=f(n/L), if n/L is an integer, and otherwise g(n)=0. In an embodiment of the present invention, an integer upsampling factor L is used, such as L=4, 6, 8, 12, 16, . . . however, other values of L including integer values can likewise be employed.

Interpolation filter module 302 generates a plurality of interpolated read samples 314 from the upsampled read samples 312. In an embodiment of the present invention, the interpolation filter 302 is an ideal filter has an impulse response that is a finite sinc (sin(x)/x) function, however, other interpolation filters including non-ideal filters can likewise be used within the broad scope of the present invention.

Peak detection module 304 identifies a plurality of peak samples 316 from the plurality of interpolated read samples 316. This can be accomplished in different ways, as will be described further in conjunction with FIG. 9. For instance, the peak detection module 304 can begin by identifying one of the plurality of peak samples 316 by comparing the magnitude of successive ones of the plurality of filtered samples 314. Once a peak is found, the peak detection module 304 can look for the next peak around the sample that is L samples away. However, given an offset in frequencies between the actual and ideal read frequencies, this next peak, that may be have a positive or negative value, may be one or more neighboring samples away. Again, comparing the magnitude of the sample with j neighboring samples (for instance, j=2, 3, 4, 6, . . . ), can determine the position of the next peak, and so on.

Slicer/comparison module 308 performs the functions of slicing the peaks and detecting the pattern indicative of the spiral sync mark. In particular, the peak samples 316 are sliced into binary decoded bits that are compared with the special pattern, used to generate the spiral sync marks. Slicer/comparison module 308 compares these patterns on a bit by bit basis and generates a count that represents the number of bits that match. When the number of bits matching the special pattern compare favorably to a comparison threshold, slicer/comparison module 308 determines that the special pattern has been found in the sequence of decoded bits and asserts the SSM detection signal 320.

Magnitude estimation module 306 generates a magnitude estimation signal 318 from the plurality of peak samples 316. In an embodiment of the present invention, magnitude estimation module 306 convolves the plurality of peak samples 316 by a sequence of alternating polarity (1, −1, 1, −1, etc.) and calculates the absolute magnitude of the result to generate magnitude estimation signal 318. In particular, the signs of alternating peaks are inverted and summed over a window of W successive peak samples 316 (where W=2, 3, 4, 6, 8, 12, or 16, etc., either an integer power of two or other integer). In the event that the spiral burst signal is present, the peaks alternate. Convolving the peaks by the alternating polarity sequence causes the magnitude of the samples to add constructively. Taking the absolute magnitude of this sum yields a magnitude estimation signal 318 that is a relatively large positive number in response to a spiral burst signal being read and a smaller number in response to other signals such as noise, other data, etc. being read. For each new peak sample 316, the detection window of detection estimation module 306 moves to encompass the newest peak sample 316 and to eliminate the oldest peak sample 316. In response, an updated decoded binary bit pattern is generated and the magnitude estimation signal 318 is updated.

Figure 9:
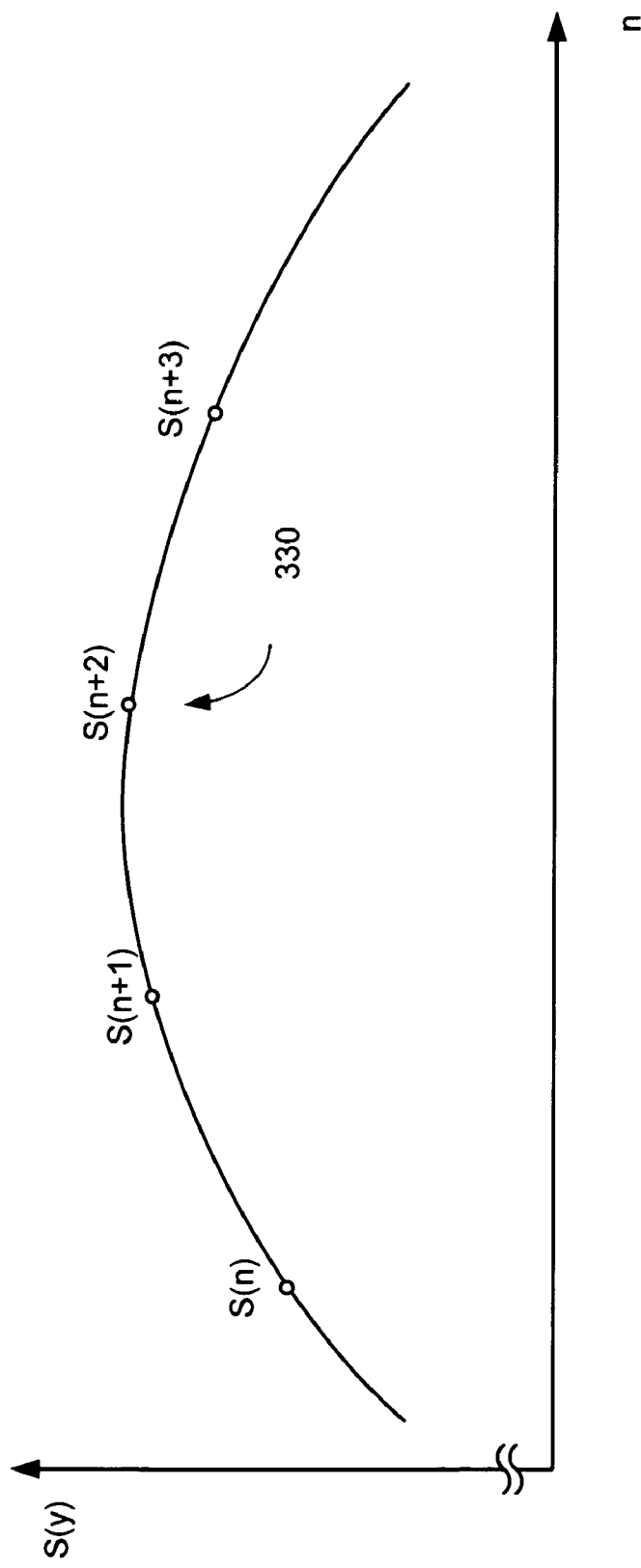
FIG. 9 presents a graphical representation of a plurality of interpolated read samples 330 in accordance with an embodiment of the present invention.

FIG. 9 presents a graphical representation of the operation of peak detection module 304 in accordance with an embodiment of the present invention. In particular, an example is presented that represents a neighborhood of four interpolated read samples 314 as samples {S(n), S(n+1), S(n+2) and S(n+3)}. It should be noted that the magnitudes of neighboring samples can be compared in different ways to determine that a particular sample corresponds to a peak. In particular, the plurality of neighboring samples {S(n), S(n+1), S(n+2) and S(n+3)} can be compared to identify the sample 330 (in this case S(n+2)) with the greatest absolute magnitude. In the alternative, peak detection module 304 can identify peak samples by calculating a plurality of successive gradients and detecting an inversion in the polarity between two successive gradients of the plurality of successive gradients. In this case, the first gradient S(n+1)−S(n) is positive, and S(n+2)−S(n+1) is also positive. However, S(n+3)−S(n+2) is negative, indicating the passage of the peak along the interval between [(n+3), (n+1)]. In this circumstance the peak 330 can be estimated by the intermediate value, S(n+2).

Figure 10:
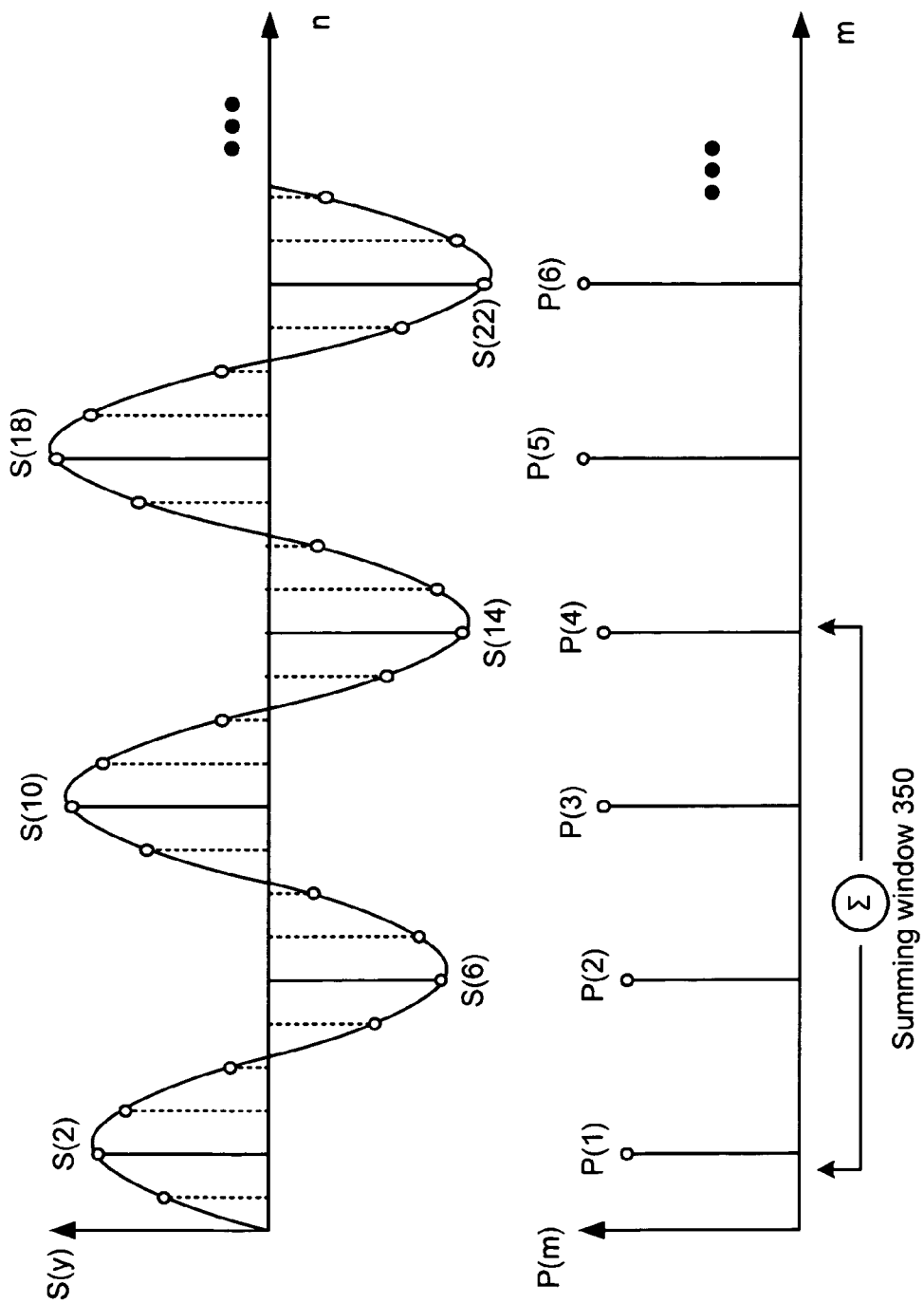
FIG. 10 presents a graphical representation of the operation of magnitude estimation module 306 in accordance with an embodiment of the present invention.

FIG. 10 presents a graphical representation of the operation of magnitude estimation module 306 in accordance with an embodiment of the present invention. In particular, an example is presented that represents a plurality of interpolated read samples 314 as S(y) with y=1, 2, 3 ... 24, expressly shown with an upsampling factor L=4. In this illustration, peak detection module 304 has identified interpolated read samples 314 represented by S(2), S(6), S(10), S(14), S(18) and S(22) as corresponding to peak samples 316. Magnitude estimation module 306 inverts the sign of every other one of the peak samples 316, in this case S(6), S(14) and S(22), to form the values P(m), m=y/L for integer values. In this example, magnitude estimation module 306 forms magnitude estimation signal 318 with a sliding window that calculates the sum of the four preceding values of P(m).

It should be noted, that while spiral sync mark detector 142 has been described in terms of the assertion of spiral sync mark detection signal 320, the upsampling module 300, interpolation filter module 302, peak detection module 304 and magnitude estimation module 306, with the appropriate choice of summing window 350, can likewise be used to integrate the magnitude of a spiral burst for the purposes of generating a position error signal as described above.

Figure 11:
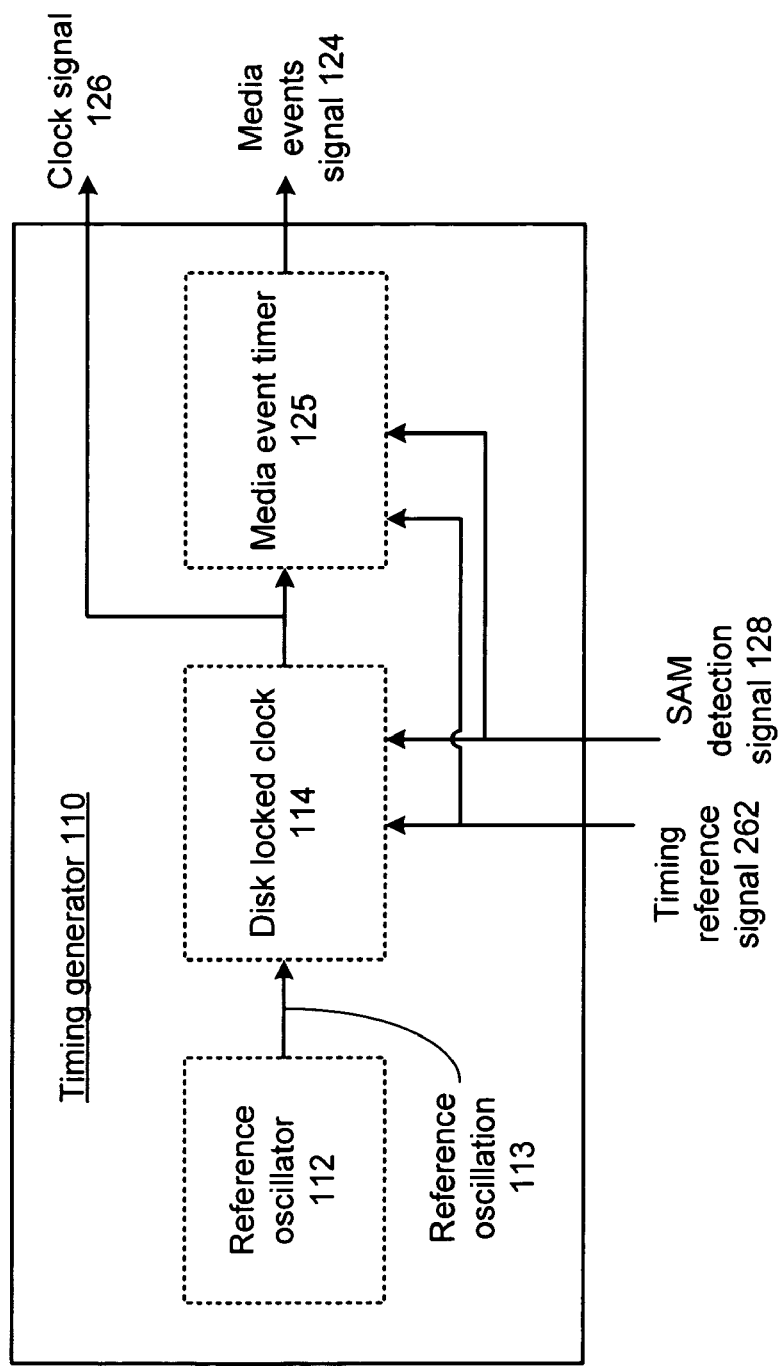
FIG. 11 presents a block diagram representation of a timing generator 110 in accordance with an embodiment of the present invention.

FIG. 11 presents a block diagram representation of a timing generator 110 in accordance with an embodiment of the present invention. In particular a timing generator 110 is presented that can include components of the read/write channel 140, disk formatter 125 and/or servo formatter 120. Timing generator 110 includes a reference oscillator 112, such as a crystal oscillator circuit with an on-board crystal or a crystal that is external to timing generator 110, for generating a reference oscillation 113. Disk locked clock 114 provides at least one clock signal 126, such as a data frequency clock or a servo frequency clock. In particular, the clock signal 126 is locked in phase and/or frequency with the timing reference signal 262 (during the self servo write mode), or from detected servo address marks via servo address mark (SAM) detection signal 128 (after the servo wedges have been written to the disk) so as to provide a substantially constant number of clock cycles between successive servo address marks. In an embodiment of the present invention, disk locked clock 114 includes a phase-locked loop (PLL) circuit that uses the phase error between a divided reference signal and either the timing reference signal 262 or a servo address mark detection signal 128 (after the servo wedges are written and when a servo address mark is detected) to adjust the phase or frequency in a closed loop control configuration.

Clock signal 126 and either timing reference signal 262 or SAM detection signal 128 (again depending on whether the disk controller is operating in a self servo write mode prior to the servo wedges being completely written, or in a normal mode of operation after the servo wedges are present) are used by media event timer 125 to produce media events signal 124, to trigger one or more media events. In an embodiment of the present invention, media events signal 124 provides the start times of one or more events such as a write event, a read event, timing event, and a servo control event that can be part of a read operation, write operation, servo control signal and other signal such as control signal used for timing or triggering the operation of the disk controller 130. These events can be part of a formatting of disk drive unit 100 during initial formatting as part of the factory setup and initialization of the drive, during subsequent formatting operations of disk drive unit 100 and during other use of disk drive 100 in normal operation. The start times of these events, since they are correlated to specific locations on the disk 102, are more precise than if generated by a constant frequency clock and automatically provide compensation for possible servo spin-speed variations.

Figure 12:
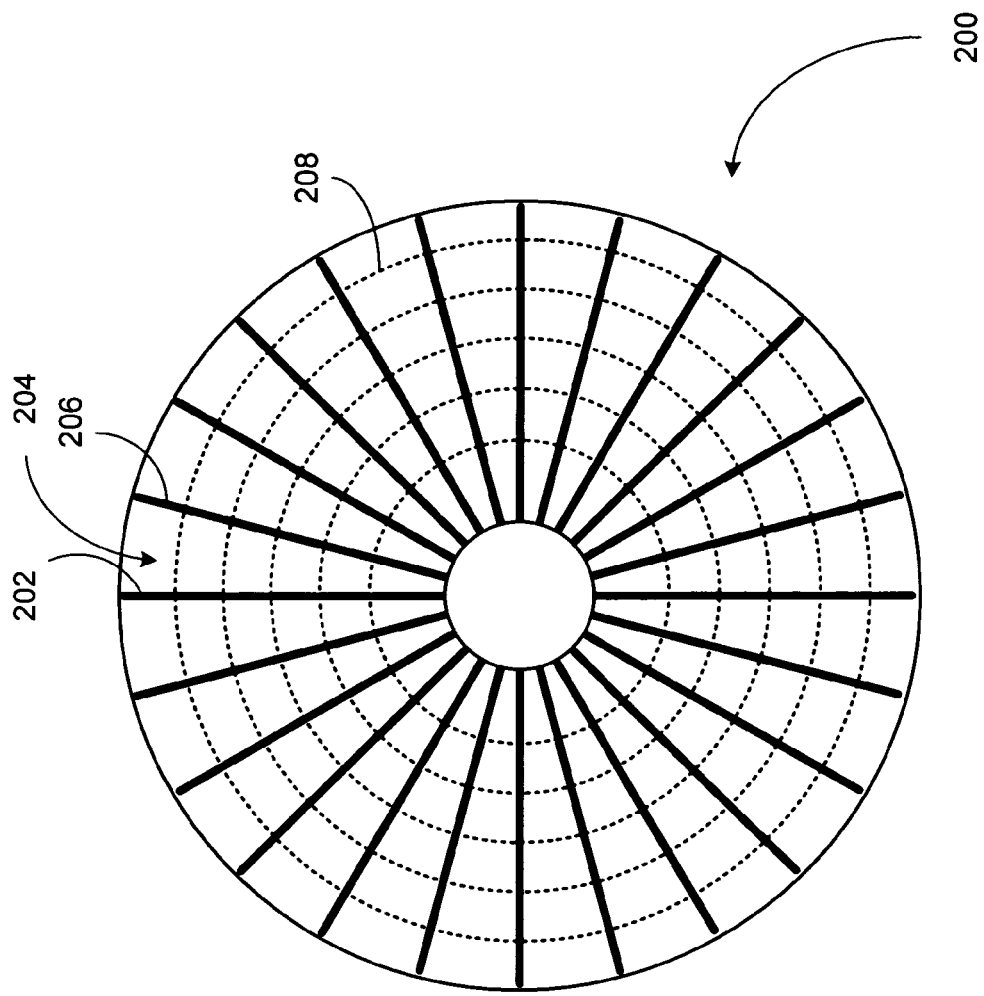
FIG. 12 presents a pictorial representation of a disk 200 having a plurality of servo wedges and a plurality of tracks in accordance with an embodiment of the present invention.

FIG. 12 presents a pictorial representation of a disk 200 having a plurality of servo wedges and a plurality of tracks in accordance with an embodiment of the present invention. In particular, disk 200, such as disk 102, writes the servo wedges on the disk after having obtained position and timing lock on the servo spirals of the disk, either in a the factory when the disk drive 100 is manufactured, or during some other disk initialization, reformatting or recovery operation. Twenty-four radial servo wedges, including adjacent servo wedges 202 and 206, are written on the disk 200. While the servo wedges are represented as linear, non-linear configurations including arcs can also be employed, particularly when disk 200 is implemented in a disk drive, such as disk drive unit 100 that includes an arm 106 that is moved by actuator 108 over the surface of the disk 200 by rotation. Further, while 24 servo wedges are shown for illustration purposes, greater numbers of servo wedges, such as two hundred or more can be employed.

Five tracks, including track 208, are shown for illustrative purposes, however, a far greater number of tracks would be employed in an actual implementation. Each servo wedge includes a servo field associated with each track. One or more sectors of user or control data are stored along the track between consecutive servo wedges. Further details regarding the contents of a servo field are presented in conjunction with FIG. 13.

Figure 13:
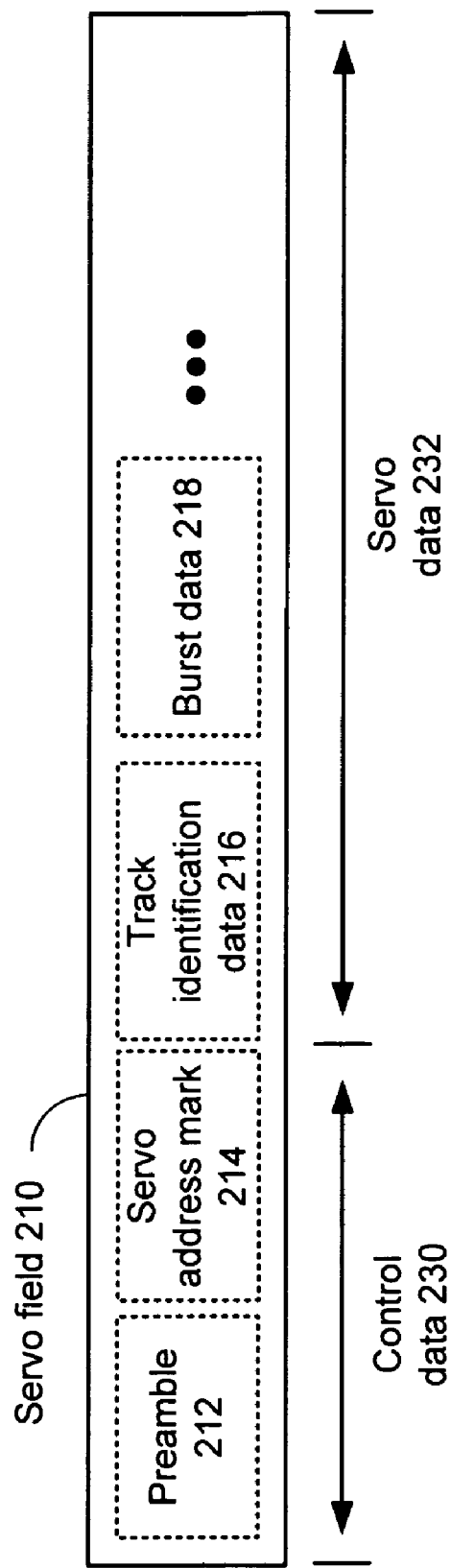
FIG. 13 presents a block diagram representation of a servo field 210 in accordance with an embodiment of the present invention.

FIG. 13 presents a block diagram representation of a servo field 210 in accordance with an embodiment of the present invention. In particular, a servo field typically begins with control data 230 that includes a preamble 212 and servo address mark 214 that allow the disk controller to recognize the beginning of the servo field 210 and the beginning of the servo data 232. An index mark can optionally be included in control data 230 in place of, or in addition to servo address mark 214 to indicate a particular servo wedge that is the first or "index" wedge for easy decoding by the disk controller 130. Servo data 232 includes track identification data 216 for identifying the particular track being read, and burst data 218 for providing subtrack head alignment data that facilitates control to a track centerline and to facilitate track seek movements of the read/write head, etc. Servo address mark 214 is used for timing generation in the disk controller 130 to time the start time for various events, such as write operations, synchronous identification of a servo wedge during spin-up of the disk, etc. While not shown, the servo data can also include other data including a head number for a multi-head disk drive, and a wedge number that identifies the current wedge, etc.

Figure 14:
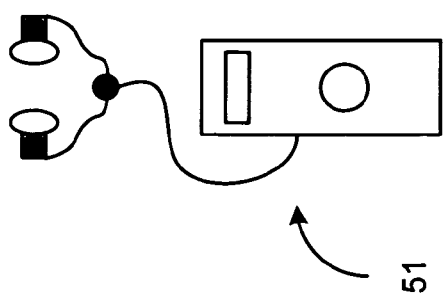
FIG. 14 presents a pictorial representation of a handheld audio unit 51 in accordance with an embodiment of the present invention.

FIG. 14 presents a pictorial representation of a handheld audio unit 51 in accordance with an embodiment of the present invention. In particular, disk drive unit 100 can include a small form factor magnetic hard disk whose disk 102 has a diameter 1.8" or smaller that is incorporated into or otherwise used by handheld audio unit 51 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format.

Figure 15:
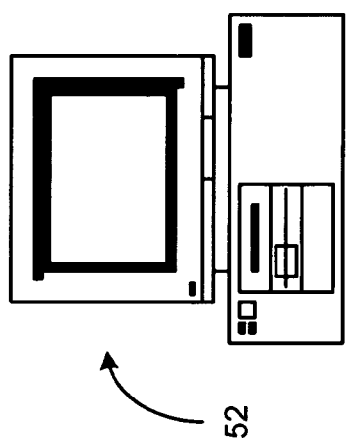
FIG. 15 presents a pictorial representation of a computer 52 in accordance with an embodiment of the present invention.

FIG. 15 presents a pictorial representation of a computer 52 in accordance with an embodiment of the present invention. In particular, disk drive unit 100 can include a small form factor magnetic hard disk whose disk 102 has a diameter 1.8" or smaller, a 2.5" or 3.5" drive or larger drive for applications such as enterprise storage applications. Disk drive 100 is incorporated into or otherwise used by computer 52 to provide general purpose storage for any type of information in digital format. Computer 52 can be a desktop computer, or an enterprise storage devices such a server, of a host computer that is attached to a storage array such as a redundant array of independent disks (RAID) array, storage router, edge router, storage switch and/or storage director.

Figure 16:
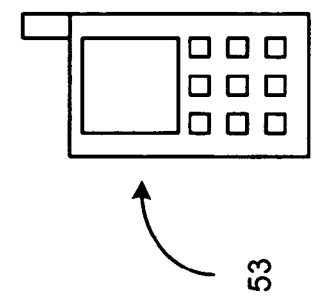
FIG. 16 presents a pictorial representation of a wireless communication device 53 in accordance with an embodiment of the present invention.

FIG. 16 presents a pictorial representation of a wireless communication device 53 in accordance with an embodiment of the present invention. In particular, disk drive unit 100 can include a small form factor magnetic hard disk whose disk 102 has a diameter 1.8" or smaller that is incorporated into or otherwise used by wireless communication device 53 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats that may be captured by an integrated camera or downloaded to the wireless communication device 53, emails, webpage information and other information downloaded from the Internet, address book information, and/or any other type of information that may be stored in a digital format.

In an embodiment of the present invention, wireless communication device 53 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 53 is capable of communicating via the Internet to access email, download content, access websites, and provide steaming audio and/or video programming. In this fashion, wireless communication device 53 can place and receive telephone calls, text messages such as emails, short message service (SMS) messages, pages and other data messages that can include attachments such as documents, audio files, video files, images and other graphics.

Figure 17:
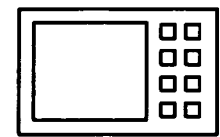
FIG. 17 presents a pictorial representation of a personal digital assistant 54 in accordance with an embodiment of the present invention.

FIG. 17 presents a pictorial representation of a personal digital assistant 54 in accordance with an embodiment of the present invention. In particular, disk drive unit 100 can include a small form factor magnetic hard disk whose disk 102 has a diameter 1.8" or smaller that is incorporated into or otherwise used by personal digital assistant 54 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats, emails, webpage information and other information downloaded from the Internet, address book information, and/or any other type of information that may be stored in a digital format.

Figure 18:
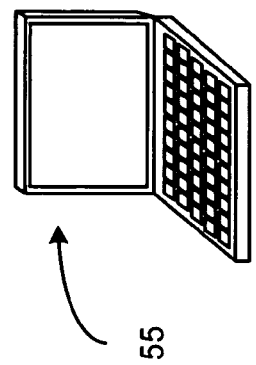
FIG. 18 presents a pictorial representation of a laptop computer 55 in accordance with an embodiment of the present invention.

FIG. 18 presents a pictorial representation of a laptop computer 55 in accordance with an embodiment of the present invention. In particular, disk drive unit 100 can include a small form factor magnetic hard disk whose disk 102 has a diameter 1.8" or smaller, or a 2.5" drive. Disk drive 100 is incorporated into or otherwise used by laptop computer 52 to provide general purpose storage for any type of information in digital format.

Figure 19:
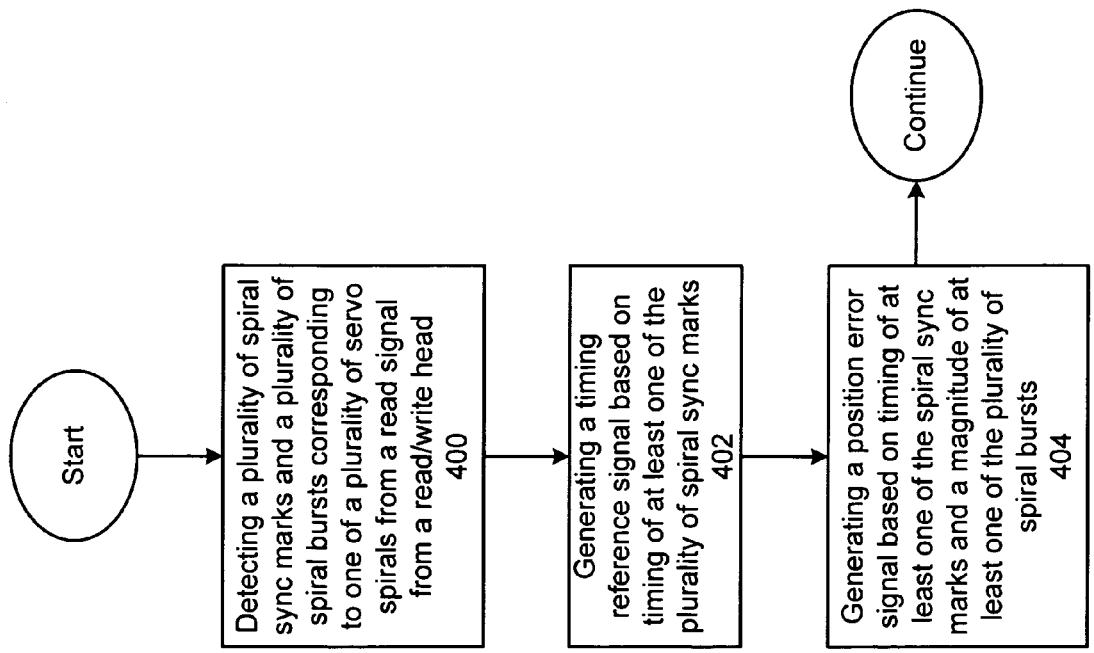
FIG. 19 presents a flowchart representation of a method in accordance with an embodiment of the present invention.

FIG. 19 presents a flowchart representation of a method in accordance with an embodiment of the present invention. In particular, a method is presented that can be used in conjunction with one or more of the features or functions described in association with FIGS. 1-18. In step 400, a plurality of spiral sync marks and a plurality of spiral bursts are detected corresponding to one of a plurality of servo spirals from a read signal from the read/write head of a disk drive. In step 402, a timing reference signal is generated based on timing of at least one of the plurality of the spiral sync marks. In step 404, a position error signal is generated based on timing of at least one of the plurality of spiral sync marks and a magnitude of at least one of the plurality of spiral bursts, wherein the timing reference signal and the position error signal are used by the disk drive for timing and positioning in self writing initial servo wedges to the disk.

In an embodiment of the present invention, step 400 includes comparing a magnitude of the read signal to a signal threshold, and triggering the detection of the plurality of spiral sync marks and a plurality of spiral bursts when the magnitude of the read signal compares favorably to the signal threshold. Step 400 can further include detecting the plurality of spiral sync marks based on the detection of peaks in the read signal, such as by upsampling the read signal to form interpolated read samples, and detecting the plurality of spiral sync marks based on the detection of peaks in the interpolated read samples. In addition, step 400 can include identifying a centermost one of the plurality of spiral sync marks, and step 404 can include generating the position error signal based on a magnitude of a first of the plurality of spiral burst that precedes the centermost one of the plurality of spiral sync marks and a magnitude of a second of the plurality of spiral burst that succeeds the centermost one of the plurality of spiral sync marks. Also, step 400 can include integrating the magnitude of the first of the plurality of spiral bursts to generate a first integrated burst magnitude, and integrating the magnitude of the second of the plurality of spiral bursts to generate a second integrated burst magnitude. Based on these values, step 404 can include generating the position error signal based on the difference between the first integrated burst magnitude and the second integrated burst magnitude. Step 400 can also include detecting a first of the plurality of spiral sync marks, generating a spiral sync mark timing window that corresponds to the estimated timing of a subsequent one of the plurality of spiral sync marks, detecting the subsequent one of the plurality of spiral sync marks within the spiral sync mark timing window. Likewise, step 400 can include generating a spiral burst timing window that corresponds to the estimated timing of a subsequent spiral burst of the plurality of spiral bursts, based on a detected spiral sync mark, and detecting the subsequent one of the plurality of spiral bursts within the spiral burst timing window.

In an embodiment, step 402 includes identifying a centermost one of the plurality of spiral sync marks, and generating a timing reference signal based on timing of the centermost one of the plurality of spiral sync marks. Alternatively, step 400 integrating a magnitude of the plurality spiral bursts to form a burst magnitude integration, identifying a spiral burst centroid based on the burst magnitude integration, and generating the position error signal based on a position of the spiral burst centroid.

Figure 20:
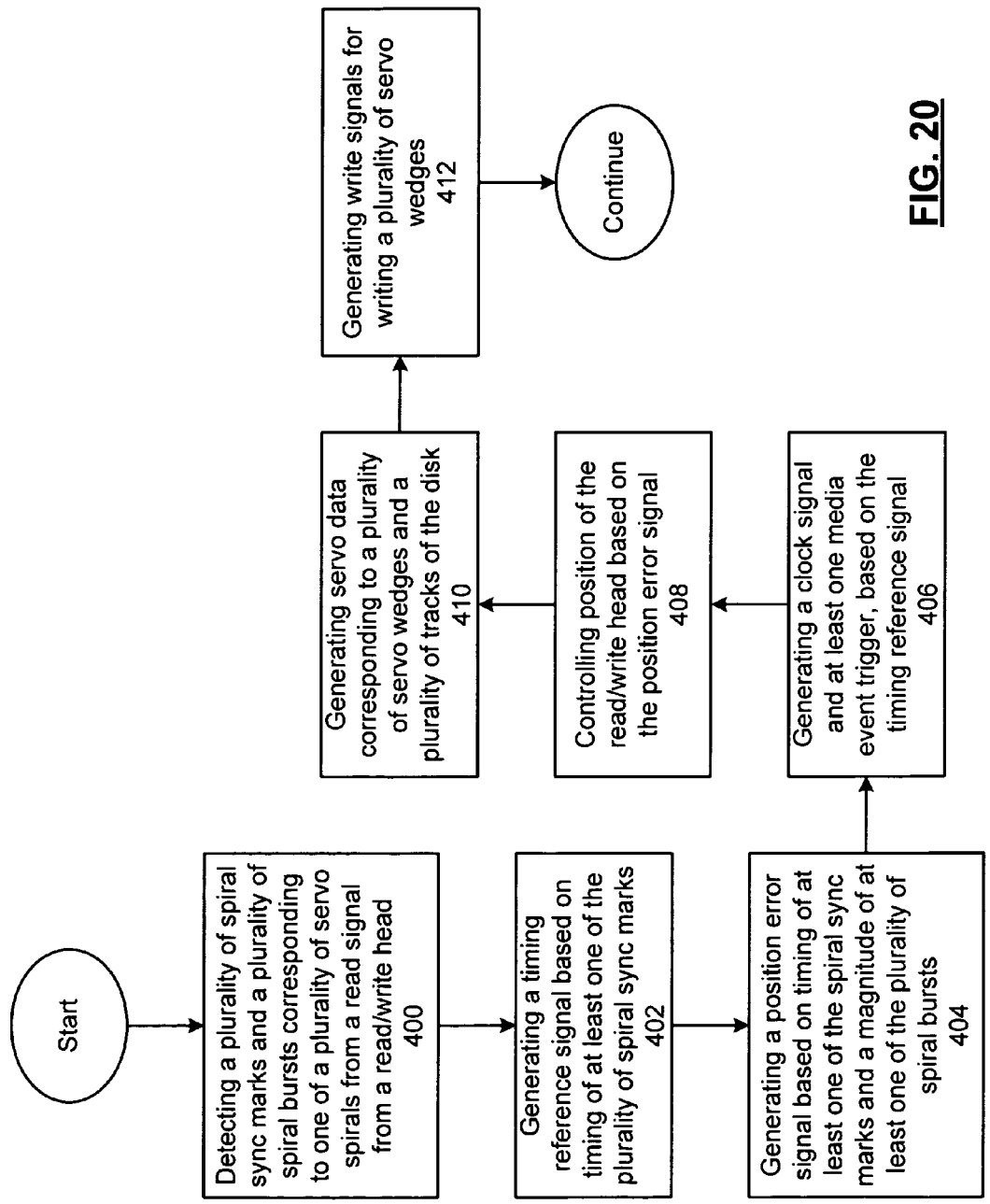
FIG. 20 presents a flowchart representation of a method in accordance with an embodiment of the present invention.

FIG. 20 presents a flowchart representation of a method in accordance with an embodiment of the present invention. A method is presented that can be used in conjunction with one or more of the features or functions described in association with FIGS. 1-19. In particular, this method includes several steps common to the method of FIG. 19 that are referred to by common reference numerals. In addition, the method generates a clock signal and at least one media event trigger, based on the timing reference signal, as shown in step 406. In step 408, the position of the read/write head is controlled based on the position error signal. In step 410, servo data is generated corresponding to a plurality of servo wedges of the disk. In step 412, write signals are generated for writing the plurality of servo wedges on the disk, based on the clock signal and the at least one media event trigger.

While the various embodiments described herein focus primarily on the detection of bipolar sinusoidal read signals that result from the reading of a servo spiral such as servo spiral 160, unipolar sinusoidal signals, possibly used in conjunction with PMR, can likewise be detected by AC coupling these signals to create a bipolar signal, or by other modifications.

Further, while the various embodiments described herein describe upsampling and interpolating a discrete-time read signal, alternatively the present invention can operate by oversampling a read signal at a sampling frequency that is a multiple M above a Nyquist sampling rate of the read signal, where M is either an integer or a fraction. In this fashion, the peak detection, such as by peak detection module 304, identifies the peaks in this oversampled read signal, rather than from interpolated read samples.

While the present invention has been described in terms of a magnetic disk, other nonmagnetic storage devices including optical disk drives including compact disks (CD) drives such as CD-R and CD-RW, digital video disk (DVD) drives such as DVD-R, DVD+R, DVD-RW, DVD+RW, etc can likewise be implemented in accordance with the functions and features of the presented invention described herein.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The various circuit components can be implemented using 0.35 micron or smaller CMOS technology. Provided however that other circuit technologies, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Thus, there has been described herein an apparatus and method, as well as several embodiments including a preferred embodiment, for implementing a self servo writing disk controller. Various embodiments of the present invention hereindescribed have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A self servo writing disk controller for use in a disk drive having at least one read/write head for reading data from and writing data to a disk, the self servo writer comprising:

a spiral detection module that analyzes a read signal from the read/write head, detects a plurality of spiral sync marks and a plurality of spiral bursts corresponding to one of a plurality of servo spirals written on the disk, and that generates a timing reference signal based on timing of at least one of the plurality of the spiral sync marks and a position error signal based on timing of at least one of the plurality of spiral sync marks and a magnitude of at least one of the plurality of spiral bursts, wherein the spiral detection module compares a magnitude of the read signal to a signal threshold, and wherein spiral detection module triggers the detection of the plurality of spiral sync marks and a plurality of spiral bursts when the magnitude of the read signal compares favorably to the signal threshold and a decoded binary pattern matches a predefined pattern;

a timing generator, operably coupled to the spiral detection module, for generating a clock signal and for generating at least one media event trigger that is based on the timing reference signal;

a device controller, operably coupled to the spiral detection module, for controlling at least one drive device based on the position error signal;

a servo data generation module that generates servo data corresponding to a plurality of servo wedges of the disk; and a servo write module, operably coupled to the servo data generation module and the timing generator, that generates write signals for writing the plurality of servo wedges on the disk based on the clock signal and the at least one media event trigger.

2. The self servo writing disk controller of claim 1 wherein the spiral detection module detects the plurality of spiral sync marks based on the detection of peaks in the read signal.

3. The self servo writing disk controller of claim 1 wherein the spiral detection module upsamples the read signal to form interpolated read samples and that detects the plurality of spiral sync marks based on the detection of peaks in the interpolated read samples.

4. The self servo writing disk controller of claim 1 wherein the spiral detection module detects the plurality of spiral sync marks by detecting a first of the plurality of spiral sync marks, generating a spiral sync mark timing window that corresponds to the estimated timing of a subsequent one of the plurality of spiral sync marks, and the detection of the subsequent one of the plurality of spiral sync marks within the spiral sync mark timing window.

5. The self servo writing disk controller of claim 1 wherein the spiral detection module detects the plurality of spiral bursts by detecting one of the plurality of spiral sync marks, generating a spiral burst timing window that corresponds to the estimated timing of a subsequent spiral burst of the plurality of spiral bursts, and the detection of the subsequent one of the plurality of spiral bursts within the spiral burst timing window.

6. The self servo writing disk controller of claim 1 wherein the spiral detection module identifies a centermost one of the plurality of spiral sync marks and that generates the position error signal based on a magnitude of a first of the plurality of spiral burst that precedes the centermost one of the plurality of spiral sync marks and a magnitude of a second of the plurality of spiral burst that succeeds the centermost one of the plurality of spiral sync marks.

7. The self servo writing disk controller of claim 6 wherein the spiral detection module integrates the magnitude of the first of the plurality of spiral burst to generate a first integrated burst magnitude and integrates the magnitude of the second of the plurality of spiral bursts to generate a second integrated burst magnitude and that generates the position error signal based on the difference between the first integrated burst magnitude and the second integrated burst magnitude.

8. The self servo writing disk controller of claim 1 wherein the spiral detection module integrates a magnitude of the plurality spiral bursts to form a burst magnitude integration, identifies a spiral burst centroid based on the burst magnitude integration, and that generates the position error signal based on a position of the spiral burst centroid.

9. The self servo writing disk controller of claim 1 wherein the spiral detection module identifies a centermost one of the plurality of spiral sync marks and generates a timing reference signal based on timing of the centermost one of the plurality of spiral sync marks.

10. A method for use in a disk drive having at least one read/write head for reading data from and writing data to a disk, the method comprising:
    detecting a plurality of spiral sync marks and a plurality of spiral bursts corresponding to one of a plurality of servo Spirals from a read signal from the read/write head, by:
        comparing a magnitude of the read signal to a signal threshold; and
        triggering the detection of the plurality of spiral sync marks and a plurality of spiral bursts when the magnitude of the read signal compares favorably to the signal threshold;
    generating a timing reference signal based on timing of at least one of the plurality of the spiral sync marks;
    generating a position error signal based on timing of at least one of the plurality of spiral sync marks and a magnitude of at least one of the plurality of spiral bursts;
    generating a clock signal and at least one media event trigger, based on the timing reference signal;
    controlling position of the read/write head based on the position error signal;
    generating servo data corresponding to a plurality of servo wedges of the disk; and
    generating write signals for writing the plurality of servo wedges on the disk based on the clock signal and the at least one media event trigger.

11. The method of claim 10 wherein the step of detecting a plurality of spiral sync marks and a plurality of spiral bursts includes:
    detecting the plurality of spiral sync marks based on the detection of peaks in the read signal.

12. The method of claim 10 wherein the step of detecting a plurality of spiral sync marks and a plurality of spiral bursts includes:
    upsampling the read signal to form interpolated read samples; and
    detecting the plurality of spiral sync marks based on the detection of peaks in the interpolated read samples.

13. The method of claim 10 wherein the step of detecting a plurality of spiral sync marks and a plurality of spiral bursts includes:
    detecting a first of the plurality of spiral sync marks, generating a spiral sync mark timing window that corresponds to the estimated timing of a subsequent one of the plurality of spiral sync marks; and
    detecting the subsequent one of the plurality of spiral sync marks within the spiral sync mark timing window.

14. The method of claim 10 wherein the step of detecting a plurality of spiral sync marks and a plurality of spiral bursts includes:
    detecting one of the plurality of spiral sync marks;
    generating a spiral burst timing window that corresponds to the estimated timing of a subsequent spiral burst of the plurality of spiral bursts; and
    detecting the subsequent one of the plurality of spiral bursts within the spiral burst timing window.

15. The method of claim 10 wherein the step of detecting a plurality of spiral sync marks and a plurality of spiral bursts includes:
    identifying a centermost one of the plurality of spiral sync marks;
    wherein the step of generating the position error signal generates the position error signal based on a magnitude of a first of the plurality of spiral burst that precedes the centermost one of the plurality of spiral sync marks and a magnitude of a second of the plurality of spiral burst that succeeds the centermost one of the plurality of spiral sync marks.

16. The method of claim 15 wherein the step of detecting a plurality of spiral sync marks and a plurality of spiral bursts includes:
    integrating the magnitude of the first of the plurality of spiral burst to generate a first integrated burst magnitude; and
    integrating the magnitude of the second of the plurality of spiral bursts to generate a second integrated burst magnitude;
    wherein the step of generating the position error signal generates the position error signal based on the difference between the first integrated burst magnitude and the second integrated burst magnitude.

17. The method of claim 10 wherein the step of generating the position error signal includes:
    integrating a magnitude of the plurality spiral bursts to form a burst magnitude integration;
    identifying a spiral burst centroid based on the burst magnitude integration; and
    generating the position error signal based on a position of the spiral burst centroid.

18. The method of claim 10 wherein the step of generating a timing reference signal includes:
    identifying a centermost one of the plurality of spiral sync marks; and
    generating a timing reference signal based on timing of the centermost one of the plurality of spiral sync marks.

19. A method for use in a disk drive having at least one read/write head for reading data from and writing data to a disk, the method comprising:

detecting a plurality of spiral sync marks and a plurality of spiral bursts corresponding to one of a plurality of servo spirals from a read signal from the read/write head, by comparing a magnitude of the read signal to a signal threshold; and
   triggering the detection of the plurality of spiral sync marks and a plurality of spiral bursts when the magnitude of the read signal compares favorably to the signal threshold;
generating a timing reference signal based on timing of at least one of the plurality of the spiral sync marks;
generating a position error signal based on timing of at least one of the plurality of spiral sync marks and a magnitude of at least one of the plurality of spiral bursts;
wherein the timing reference signal and the position error signal are used by the disk drive for timing and positioning in self writing initial servo wedges to the disk.

20. The method of claim 19 wherein the step of detecting a plurality of spiral sync marks and a plurality of spiral bursts includes:
   upsampling the read signal to form interpolated read samples; and
   detecting the plurality of spiral sync marks based on the detection of peaks in the interpolated read samples.

21. The method of claim 19 wherein the step of generating a timing reference signal includes:
   identifying a centermost one of the plurality of spiral sync marks; and
   generating a timing reference signal based on timing of the centermost one of the plurality of spiral sync marks.

22. The method of claim 19 wherein the step of detecting a plurality of spiral sync marks and a plurality of spiral bursts includes:
   identifying a centermost one of the plurality of spiral sync marks;
   wherein the step of generating the position error signal generates the position error signal based on a magnitude of a first of the plurality of spiral burst that precedes the centermost one of the plurality of spiral sync marks and a magnitude of a second of the plurality of spiral burst that succeeds the centermost one of the plurality of spiral sync marks.

23. The method of claim 22 wherein the step of detecting a plurality of spiral sync marks and a plurality of spiral bursts includes:
   integrating the magnitude of the first of the plurality of spiral burst to generate a first integrated burst magnitude; and
   integrating the magnitude of the second of the plurality of spiral bursts to generate a second integrated burst magnitude;
   wherein the step of generating the position error signal generates the position error signal based on the difference between the first integrated burst magnitude and the second integrated burst magnitude.

* * * * *

UNITED STATES PATENT AND TRADEMARK OFFICE
CERTIFICATE OF CORRECTION

| | |
|---|---|
| PATENT NO. | : 7,667,911 B2 |
| APPLICATION NO. | : 11/521040 |
| DATED | : February 23, 2010 |
| INVENTOR(S) | : Lau |

It is certified that error appears in the above-identified patent and that said Letters Patent is hereby corrected as shown below:

Column 19, line 3, in Claim 19: replace "head, by" with --head, by:--

Signed and Sealed this

First Day of June, 2010

David J. Kappos
*Director of the United States Patent and Trademark Office*